United States Patent Office 3,375,215
Patented Mar. 26, 1968

3,375,215
CELLOPHANE COATING COMPOSITIONS COMPRISING VINYLIDENE CHLORIDE COPOLYMER, CANDELILLA WAX AND STEARATE SALT
William P. Kane, Bon Air, Va., assignor to E. I. du Pont de Nemours and Company, Wilmington, Del., a corporation of Delaware
No Drawing. Filed Sept. 18, 1964, Ser. No. 397,608
20 Claims. (Cl. 260—23)

ABSTRACT OF THE DISCLOSURE

A heat-sealable coating composition for organic film, e.g., regenerated cellulose film comprising as the essential ingredients in a volatile organic solvent (1) a copolymer of vinylidene chloride and at least one other ethylenically unsaturated monomer copolymerizable therewith, said copolymer containing at least 87% by weight of vinylidene chloride; (2) from 2 to 6 parts by weight of candelilla wax per 100 parts of said copolymer, and (3) from 1 to 3 parts of a stearate salt selected from the group consisting of calcium and ammonium stearates. Optionally, the composition may also contain from 0.05 to 2 parts of a solid particulate material as slip agent, from 0.1 to 1 part of an organic carboxylic acid as a viscosity depressant, from 0.5 to 2.5 parts of a saturated or olefinically unsaturated amide or ketone as an additional antiblocking agent, and up to 1 part of a blending resin. The coated film releases readily from crimp seal bars used in automatic packaging machines.

---

Large quantities of cellophane carrying heat sealable coatings are used to wrap articles of commerce in automatic packaging machinery. Such machines are many in type and employ various types of sealing means. In general, the surfaces of the sealing bars are either smooth and flat, or are serrated or crimped. Machines which seal at low pressures usually contain smooth sealing bars while those machines which employ the crimped sealing bars usually operate at higher pressures, generally in excess of ten p.s.i. (pounds per square inch), frequently at 50 p.s.i. and even higher.

One type of packaging machine which employs the latter type of sealing bar is the so called "make-and-fill" packaging machine. Briefly, in such a machine a continuous web of cellophane is formed into a continuous cylindrical tubing around a vertical hollow forming tube through which the articles or commodity to be packaged are intermittently fed into the tubing by gravity. As the tubing is advanced continually, it is intermittently formed into a series of filled bags, the top and bottom seals thereof being formed in succession by a pair of opposed and cooperating crimped sealing bars. Since the two or more layers of film between the sealing bars must be stretched between the serrations of the crimped surfaces as they are pressed into intimate contact, the sealing pressures generally are in excess of 10 p.s.i. Just after the top seal of the filled bag is formed, the said bag is severed from the tubing above it and should, for smooth packaging machine performance, immediately drop away from the sealing bars as they withdraw (i.e., part, one from the other).

Otherwise, the advancing tubular film will jam the area in and around the sealing jaws along with the package stuck there. Thus it is seen that for smooth packaging machine operation the film should readily release from the sealing surface with no delay if (1) considerable loss of machine operating time while shut down for cleaning, (2) loss of product, and (3) loss of packaging film are to be avoided.

There are many types of cellophane which carry different coatings based on a variety of polymeric materials. The specific type of cellophane chosen for packaging a given article or commodity will depend on the properties of the latter and on the corresponding requirements which they place on the packaging film. Many articles may be satisfactorily packaged in films carrying a nitrocellulose based coating. Other articles require films coated with vinylidene chloride copolymer coatings, which have superior moisture proofness and low oxygen permeability, and are unaffected by the fats and oils found in certan articles such as nuts and potato chips. The cellophanes carrying vinylidene chloride copolymer coatings known to this time, however, have shown particularly poor release properties from crimped sealing bars and possess a pronounced tendency to jam in machines of the type described.

Further, there is a growing trend to smaller packages of the type described, such as individual servings of potato chips, nuts and other snack items. The total weight of the article in the packages in some cases is very small, frequently less than one ounce. The total force acting to pull the package away from the sealing bars is thus seen to be very small in some cases. In practice it is found that films requiring a force of no more than 80 g./sq. in. of seal area to pull the film from the sealing bars operates significantly better than films available heretofore, and that films requiring a force no greater than about 30 g./sq. in. of seal area operate virtually trouble-free in packaging machines.

Heretofore, it has been possible to improve the release properties of vinylidene chloride copolymer coated cellophane from crimped sealing jaws only by incorporating into the coating excessively large amounts of waxes or wax-like materials, thereby sacrificing other properties of the cellophane which are degraded by these materials. These properties includes the heat sealability of the film, its appearance, its blocking performance and the adhesion of the coating to the regenerated cellulose base sheet, to name a few. Thus, the real problem is not simply in obtaining crimp jaw release as such, but rather in obtaining satisfactory crimp jaw release without sacrificing other functional properties of the film such as those listed above.

For a given polymer coating the problem of crimp jaw release is entirely separate from that of hot stick to smooth sealing bars, and good runnability in machines employing the latter type of sealing bar. In fact, regenerated cellulose films coated with various known vinylidene chloride copolymer coating compositions which have operated trouble-free in machines with smooth sealing bars have not been at all satisfactory for use in machines with crimped sealing bars.

It is therefore an object of this invention to substantially improve the release properties of vinylidene chloride copolymer coated cellophane from crimped sealing jaws and to lower to below about 80 g./sq. in. of seal area, and preferably to below about 30 g./sq. in. of seal area, the force required to remove this type of cellophane from crimped sealing jaws after sealing at temperatures up to 280° F. It is a further object to improve the crimp jaw release properties of vinylidene chloride copolymer coated cellophane without degrading at the same time other functional properties of the film. The foregoing and related objects will more clearly appear from the detailed description which follows.

These objects are satisfactorily realized by the present invention which, briefly stated, comprises employing as the heat-sealable coating for regenerated cellulose film a coating composition comprising essentially 100 parts by weight of a vinylidene chloride copolymer containing at least 87% by weight vinylidene chloride, about 2 to 6 parts by weight of candelilla wax, and about 1 to 3 parts by weight of a stearate salt which is selected from the group consisting of calcium and ammonium stearates.

The present invention resides in the discovery that the effect of the combination of candelilla wax and stearate as a release agent for vinylidene chloride copolymer coatings is synergistic such as to produce superior release from crimped sealing bars. However, these agents have undesirable effects on coating bath viscosity, film blocking and often on the clarity of the film, which effects may be overcome by the addition, in proper amounts, of other constituents to provide a completely functional film having excellent crimped jaw release characteristics, as well as satisfactory heat-sealability, coating anchorage, and antiblocking properties. Therefore it is preferred that in addition to candelilla wax and stearate salt, the coating include a small amount of particulate solid material to confer antiblocking characteristics and film-to-film slip; between about 0.1 to 1 part by weight, based on 100 parts of vinylidene chloride copolymer, of an organic carboxylic acid to lower the viscosity of the coating lacquer; and between about 0.5 to 2.5 parts by weight of a member of the class consisting of saturated amides, olefinically unsaturated amides, and ketones each containing between 18 and 26 carbon atoms to improve the antiblocking characteristics of the film.

The copolymers of vinylidene chloride preferred for purposes of the invention are those containing at least 87% by weight, of vinylidene chloride, based on the total weight of the polymer, and one or more ethylenically unsaturated monomers copolymerizable therewith. Representative mono-olefinic monomers copolymerizable with vinylidene chloride include: acrylic acid, methyl, ethyl, isobutyl, butyl, octyl and 2-ethyl hexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide and alkyl substitution products thereof, phenyl vinyl ketone, diethyl fumarate, diethyl maleate, methylene diethyl malonate, dichlorovinylidene fluoride, itaconic acid, dimethyl itaconate, diethyl itaconate, dibutyl itaconate, vinyl pyridine, maleic anhydride, allyl glycidyl ether and other unsaturated aliphatic ethers described in U.S. Patent 2,160,943. The compounds may be generally defined as vinyl or vinylidene compounds having a single $CH_2\!\!=\!\!C\!<$ group. The most useful monomers fall within the general formula

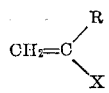

where R may be hydrogen, halogen, or saturated aliphatic radical, and X is a member of the group consisting of —Cl, —Br, —F, —CN, —C₆H₅, —COOH,

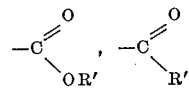

—HC=O, —OC₆H₅, —CONH₂, —CONH—R' and —CONR'₂ in which R' is alkyl.

As indicated above, candelilla wax content of the coating composition may range from 2 to 6 parts by weight of candelilla wax per 100 parts of vinylidene chloride copolymer. When candelilla wax is used in an amount less than 2 parts by weight crimp jaw release of the coated film is not satisfactory and if amounts in excess of 6 parts by weight are used the haze level of the coated film is excessively high.

The calcium or ammonium stearate is used in an amount ranging from 1 to 3 parts by weight per 100 parts by weight of vinylidene chloride copolymer. Amounts of the stearate salt in excess of 3 parts by weight have the adverse effects of undesirably increasing the viscosity of the coating lacquer and tending to cause the coated film to block, that is, of causing adjacent layers of film in a roll or stack of sheets to adhere or bond to one another.

As suggested above, in addition to the essential candelilla wax and calcium or ammonium stearate constituents, the coating additionally should include from 0.05 to 2 parts by weight per 100 parts of vinylidene chloride copolymer of a solid particulate material. The particulate material serves the purpose of improving the antiblocking properties of the film and improves the film-to-film slip. The particulate used should be insoluble in the coating and in the coating solvents. Suitable materials are numerous and include, for example, talc in amounts between about 0.2 and 1.0 part and by weight preferably between 0.3 and 0.5 part, bentonite clay in amounts between about 0.05 and 0.2 part by weight, and mica in amounts between about 0.5 and 2.0 parts by weight, in all cases for 100 parts by weight of vinylidene chloride copolymer. Below the respective lower limits, the slip of the film is inadequate, while above the upper limits the film becomes hazy. It is especially preferred that the particulate material be talc and further that it be used in the amount of 0.3 to 0.5 part by weight per 100 parts of vinylidene chloride copolymer.

The coating should also include between about 0.1 and 1 part by weight of an organic carboxylic acid to effect lowering the viscosity of the coating lacquer and of controlling the viscosity to a value satisfactory for typical coating apparatus listed hereinafter. A wide variety of mono- and poly-functional, saturated and olefinicially unsaturated, unsubstituted and hydroxy substituted carboxylic acids have been found satisfactory. Examples of suitable acids include tartaric, citric, itaconic, maleic, fumaric, lactic, gluconic and formic acids, and maleic anhydride.

The additional inclusion in the coating composition of from about 0.5 to 2.5 parts by weight of a saturated or olefinically unsaturated amide or ketone containing between 18 and 26 carbon atoms, e.g., stearamide, erucamide, or dilauryl ketone, serves to further improve the antiblocking characteristics of the film by counteracting the adverse effects of the stearate salt. It is especially preferred that this material be stearamide and that it be used in the amount of 1 to 2 parts by weight per 100 parts of vinylidene chloride copolymer.

The optional addition to the coating composition of up to about 1 part by weight of a blending resin selected from the group consisting of the glyceryl ester of maleic anhydride modified rosin, and polymerized rosin (degree of polymerization about 1.2) per 100 parts by weight of vinylidene chloride copolymer serves, in some specific cases, to improve the clarity of the films prepared with the compositions described hereinabove. For example: When the vinylidene chloride copolymer consists of 88 to 94% by weight vinylidene chloride, 6 to 12% by weight acrylonitrile and 0.01 to 2% by weight itaconic acid, it is preferred that the blending resin be included in the coating composition, that the blending resin be the glycerol ester of maleic anhydride treated rosin, and further that it be used in an amount by weight of about 1/10 that of the candelilla wax in the coating. When used in excess of about 1 part per 100 parts of vinylidene chloride copolymer the films again tend to stick to sealing bars with forces above those acceptable. When the vinylidene chloride copolymer consists of 88 to 94% by weight vinylidene chloride, 1 to 8% acrylonitrile, 1 to 8% methyl methacrylate, and 0.01 to 2% by weight itaconic acid, it is preferred that no blending resin be included in the coating, although no deleterious effects result from including it. When the vinylidene chloride copolymer consists of 88 to 94% by weight of vinylidene chloride and 6 to 12% by weight acrylonitrile, it is preferred that no blending resin be included in the coating, although no deleterious effects result from including it. When the vinylidene chloride copolymer consists of 88 to 94% by weight vinylidene chloride, 6 to 12% by weight methyl acrylate, and 0.01 to 2% by weight itaconic acid, it is preferred that no blending resin be included in the coating, although no deleterious effects result from including it. And, when the stearate salt used in the coating composition is ammonium stearate, it is preferred that no blending resin be included in the coating, although no deleterious effects result from including it.

The coating composition is applied from a typical solvent system based on tetrahydrofuran, and/or low molecular weight hydrocarbons, ketones and esters. Especially useful combinations contain 50 to 80% methyl ethyl ketone or tetrahydrofuran, and 20 to 50% toluene. The coating lacquer is made up to contain between 10 and 25% total solids. Although the lacquer may be prepared in any appropriate way, it can be conveniently prepared by mixing all the miscellaneous ingredients in a small fraction of the toluene of the solvent system (during which mixing the soluble ingredients such as the candelilla wax dissolve while the insoluble particulate material is thoroughly wetted and dispersed) and adding this mixture to a previously prepared solution of the polymer in the balance of the toluene and the other constituent. The lacquer is applied to the base sheet by any of the various coating methods known in the art, such as by dipping, use of kiss rolls, or spraying followed by removal of excess lacquer as with doctor rolls, doctor knives, or air knives, or by gravure roll coating. The coating may be applied to either one or both sides of the film. Most often the film is two-side coated. The coating weight will generally be between about 2 and 6 g./sq. meter and most often will be about 3 to 4 g./sq. meter. The solvent is removed by passing the sheet through a heated compartment.

Although the invention is described herein with specific reference to the coating of regenerated cellulose film, it is to be understood that the novel coating composition herein described is equally useful on other types of organic polymeric base sheet. Other suitable types of base sheet include films of methyl cellulose, ethyl cellulose, hydroxy ethyl cellulose, hydroxy propyl cellulose, polyvinyl alcohol partially hydrolyzed etthylene/vinyl acetate copolymers, oriented and unoriented films of polyolefins such as polyethylene, polypropylene, and copolymers thereof with other mono- and diolefins and functionally substituted olefins, polyesters such as polyethylene terephthalate, polyamides such as hexamethylene adipate, polyvinyl chloride, and polystyrene. The coating composition is also useful for coating laminated structures containing two or more sheets of regenerated cellulose, and structures containing one or more layers of cellulose laminated in combination with other types of sheets, pellicles and foils.

In the preferred practice of the present invention the regenerated cellulose film will contain a softener or mixture of softeners for the film, generally in an amount between 10 and 30% by weight based on the weight of cellulose. Typical softeners include glycerin, propylene glycol, trimethylene glycol, triethylene glycol, hexamethylene glycol and various butanediols. The thickness of the regenerated cellulose base sheet may vary widely. The unit weight of the sheet may be as low as about 15 g./sq. meter to as high as about 60 g./sq. meter. Generally the unit weight will be below about 45 g./sq. meter. In order that the coating be firmly adherent to the regenerated cellulose base sheet, the latter will generally contain an anchoring resin in an amount between about 0.01 and 1% by weight based on the weight of cellulose. Such resins include the polyalkylenimines, such as polyethylenimine and polypropylenimine, and the heat curable resins, such as urea-formaldehyde, guanidine-urea-formaldehyde, melamine-formaldehyde, and melmelamine-formaldehyde-polyalkylenepolyamine resins.

Preferably the films coated with the coating compositions of this invention are sized with a conventional wetting agent for film, e.g., sodium lauryl sulfate. This aftersize coating is for the purpose of making the film nonfogging and to improve to some degree the sliding properties of the film so that it will tend to run more smoothly in printing presses and in packaging machines other than the make-and-fill type described hereinabove. It is to be emphasized that the coated films of this invention possess satisfactory crimp jaw release properties whether aftersized or not. The amount of aftersize applied will generally be between about 1 and 30 milligrams/square meter.

The following examples will serve to further illustrate the principles and practice of the invention. All compositions are given in parts by weight unless otherwise stated. The examples are summarized in tabular form, including both the coating composition and crimp jaw release properties. The procedure followed in each example was in general the same. For purposes of illustration the lacquer preparation of Example 5 is given in detail as follows: Into 182 parts of toluene at 35° C. was placed 100 parts of a polymer consisting of 90.8 parts vinylidene chloride, 9.0 parts acrylonitrile, and 0.2 part itaconic acid and the mixture was slurried for 30 minutes. To this slurry was added 275 parts of tetrahydrofuran and the mixture stirred at 40° C. until solution was complete, which required about 20 minutes. In a separate container were placed 43 parts of toluene, 5 parts of refined candelilla wax, 0.5 part of the glyceryl ester of maleic anhydride treated rosin, 2 parts of calcium stearate, and 0.4 part of pulverized talc, and the mixture was stirred for 30 minutes at 100° C. until the wax, rosin derivative, and calcium stearate were dissolved and the talc was thoroughly slurried. The latter mixture was added to the polymer solution and the mixture was stirred for one hour at 40° C. A regenerated cellulose base sheet was coated with this lacquer and then dried. The film was aftersized with an aqueous solution of sodium lauryl sulfate in order to give a coverage of 15 milligrams per square meter of the surfactant. The film was then tested for its crimp jaw release properties (i.e., grams per square inch of seal required to release the seal from the sealer jaws), as follows: Two films each 6 inches wide are sealed together between crimped sealing jaws to form a sealed area measuring 6 inches by 0.5 inch; the sealed films are pulled away from the jaws around a freely suspended roll mounted on a strain gauge which is in turn connected to a recorder; the force necessary to remove the film from the sealing jaws is thus automatically measured and recorded.

TABLE

| Example | Polymer, 100 Parts | | | | Wax | | | | Stearate Salt | | | | Particulate | | Acid | | | |
|---|---|---|---|---|---|---|---|---|---|---|---|---|---|---|---|---|---|---|
| | VCl₂/AN[1] | VCl₂/AN/IA[2] | VCl₂/AN/MMA/IA[3] | VCl₂/MA/IA[4] | Candelilla | Ouricury | Paraffin | Pentaerythritol Tetrastearate | Calcium | Ammonium | Magnesium | Zinc | Talc | Mica | Tartaric | Formic | Itaconic | Maleic |
| 1 | | x | | | | | | | | | | | | 1 | | | | |
| 2 | | x | | | 5 | | | | | | | | 0.4 | | | | | |
| 3 | | x | | | 5 | | | | | | | | | 1 | | | | |
| 4 | | x | | | 5 | | | | 1 | | | | 0.4 | | | | | |
| 5 | | x | | | 5 | | | | 2 | | | | 0.4 | | | | | |
| 6 | | x | | | 5 | | | | 3 | | | | | | | | | |
| 7 | | x | | | 5 | | | | 2 | | | | | 1 | | | | |
| 8 | | x | | | 5 | | | | 3 | | | | | 1 | | | | |
| 9 | | x | | | 5 | | | | 3 | | | | | 1 | | | | |
| 10 | | x | | | 5 | | | | 3 | | | | 0.4 | | | | | |
| 11 | x | | | | 3 | | | | | | | | 0.4 | | 0.5 | | | |
| 12 | x | | | | 3 | | | | 1 | | | | 0.4 | | 0.5 | | | |
| 13 | | x | | | 3 | | | | 1 | | | | 0.4 | | 0.5 | | | |
| 14 | | | | x | 3 | | | | | | | | 0.4 | | 0.5 | | | |
| 15 | | | | x | 3 | | | | 1 | | | | 0.4 | | 0.5 | | | |
| 16 | | | | x | 3 | | | | 1.5 | | | | 0.4 | | 0.5 | | | |
| 17 | | x | | | 3 | | | | 2 | | | | 0.4 | | 0.5 | | | |
| 18 | | x | | | 5 | | | | 2 | | | | 0.4 | | 0.5 | | | |
| 19 | | | x | | 2 | | | | 2 | | | | 0.4 | | 0.5 | | | |
| 20 | | | x | | 2 | | | | 1 | | | | 0.4 | | 0.5 | | | |
| 21 | | | x | | 3 | | | | 2 | | | | 0.4 | | 0.5 | | | |
| 22 | | | x | | 3 | | | | 1 | | | | 0.4 | | 0.5 | | | |
| 23 | | | x | | 3 | | | | | | | | 0.4 | | 0.5 | | | |
| 24 | | | x | | 4 | | | | | | | | 0.4 | | 0.5 | | | |
| 25 | | | x | | 4 | | | | | | | | 0.4 | | 0.5 | | | |
| 26 | | x | | | 5 | | | | | 2 | | | 0.4 | | 0.5 | | | |
| 27 | | x | | | 5 | | | | | 3 | | | 0.4 | | 0.5 | | | |
| 28 | | x | | | 5 | | | | 2 | | | | 0.4 | | 0.5 | | | |
| 29 | | | x | | 2 | | | | 2 | | | | 0.4 | | 0.5 | | | |
| 30 | | | x | | 2 | | | | 1 | | | | 0.4 | | 0.5 | | | |
| 31 | | | x | | 3 | | | | 2 | | | | 0.4 | | 0.5 | | | |
| 32 | | | x | | 3 | | | | 1 | | | | 0.4 | | 0.5 | | | |
| 33 | | | x | | 3 | | | | 1 | | | | 0.4 | | 0.5 | | | |
| 34 | | | x | | 3 | | | | 1 | | | | 0.4 | | 0.5 | | | |
| 35 | | | x | | 3 | | | | 1 | | | | 0.4 | | 0.5 | | | |
| 36 | | | x | | | | | | 1 | | | | 0.4 | | 0.5 | | | |
| 37 | | | x | | | 3 | | | 1 | | | | 0.4 | | 0.5 | | | |
| 38 | | | x | | | | 3 | | 1 | | | | 0.4 | | 0.5 | | | |
| 39 | | | x | | | | | 3 | 1 | | | | 0.4 | | 0.5 | | | |
| 40 | | | x | | 3 | | | | 1.5 | | | | 0.4 | | | | 0.5 | |
| 41 | x | | | | 3 | | | | 1 | | | | 0.4 | | 0.5 | | | |
| 42 | | | x | | 3 | | | | 1 | | | | | | 0.5 | | | |
| 43 | | | x | | 3 | | | | 4 | | | | | | 0.5 | | | |
| 44 | | | x | | | | | | | | | | 0.4 | | 0.5 | | | |
| 45 | | x | | | 10 | | | | | | | | 0.4 | | 0.5 | | | |
| 46 | x | | | | 5 | | | | | | 2 | | 0.4 | | 0.5 | | | |
| 47 | | | | | 5 | | | | | | | 2 | 0.4 | | | | | |
| 48 | | | x | | 2 | | | | 2 | | | | 0.4 | | 0.5 | | | 0. |
| 49 | | x | | | 2 | | | | 2 | | | | 0.4 | | 0.5 | | | 0.5 |

| Example | Slip Agent | | Blending Resin | | Solvent | | | | | | Crimp Jaw Sticking (g./3 in.² seal), Sealing Temp., °F. | | | | | | Bath Viscosity | Appearance |
|---|---|---|---|---|---|---|---|---|---|---|---|---|---|---|---|---|---|---|
| | Stearamide | Dilauryl Ketone | Beckacite 1118[5] | Polypale D[6] | THF/Tol[7] | MEK/Tol[8] | THF/EA[9] | THF/TCTFE[10] | THF/Tol/PrOH[11] | Aftersize | 180 | 220 | 250 | 260 | 270 | 280 | | |
| 1 | | 2 | | | x | | | | | x | 0 | 150 | 400 | 600 | | 800 | | |
| 2 | | | 0.5 | | x | | | | | x | 0 | 50 | 250 | 350 | 400 | 450 | | |
| 3 | | | 0.5 | | x | | | | | x | 0 | 60 | 250 | 360 | 420 | 460 | | |
| 4 | | | 0.5 | | x | | | | | x | 0 | 50 | 50 | 100 | 200 | 300 | [12]B | [12]H |
| 5 | | | 0.5 | | x | | | | | x | 0 | 0 | 0 | 75 | 90 | 120 | H | H |
| 6 | | | 0.5 | | x | | | | | x | 0 | 0 | 0 | 25 | | 75 | H | |
| 7 | | | 0.5 | | x | | | | | x | 0 | 0 | 0 | 50 | 75 | 100 | H | |
| 8 | | | 0.5 | | x | | | | | x | 0 | 0 | 0 | 0 | 25 | 60 | H | |
| 9 | | | 1.0 | | x | | | | | x | 0 | 0 | 100 | 150 | 200 | 250 | H | |
| 10 | | | 1.0 | | x | | | | | | 0 | 0 | 75 | 100 | 150 | 250 | H | |
| 11 | | 2 | | | x | | | | | | 0 | 0 | 0 | 0 | 100 | 275 | | |
| 12 | | 2 | | | x | | | | | | 0 | 0 | 0 | 0 | 0 | 85 | | |
| 13 | | 2 | 0.45 | | x | | | | | | 0 | 0 | 0 | 0 | 0 | 65 | | |
| 14 | | 2 | | | x | | | | | | 0 | 35 | 225 | 250 | 275 | 300 | | |
| 15 | | 2 | | | x | | | | | | 0 | 0 | 0 | 20 | 30 | 25 | | |
| 16 | | 2 | 0.45 | | x | | | | | | 0 | 0 | 0 | 50 | 75 | 100 | | |
| 17 | | 2 | 0.3 | | x | | | | | x | 0 | 0 | 0 | 0 | 0 | 0 | | |
| 18 | | | 0.5 | | x | | | | | | 0 | 0 | 0 | 0 | 0 | 0 | | |
| 19 | | 2 | | | x | | | | | | 0 | 0 | 0 | 0 | 0 | 0 | | |
| 20 | | 2 | | | x | | | | | | 0 | 0 | 0 | 0 | 0 | 0 | | |
| 21 | | 2 | | | x | | | | | | 0 | 0 | 0 | 0 | 0 | 0 | | |
| 22 | | 2 | | | x | | | | | x | 0 | 50 | 200 | 250 | 300 | 400 | | |
| 23 | | 1 | | | x | | | | | | 0 | 50 | 200 | 250 | 300 | 400 | | |
| 24 | | 1 | | | x | | | | | | 0 | 50 | 200 | 250 | 300 | 400 | | |
| 25 | | 1 | 0.5 | | x | | | | | | 0 | 0 | 0 | 0 | 0 | 0 | | |
| 26 | | 2 | | | x | | | | | | 0 | 0 | 0 | 0 | 0 | 0 | | |
| 27 | | 2 | | | x | | | | | | | | | | | | | |

TABLE—Continued

| Example | Slip Agent | | Blending Resin | | Solvent | | | | | | Aftersize | Crimp Jaw Sticking (g./3 in.² seal), Sealing Temp., °F. | | | | | | Bath Viscosity | Appearance |
| --- | --- | --- | --- | --- | --- | --- | --- | --- | --- | --- | --- | --- | --- | --- | --- | --- | --- | --- | --- |
| | Stearamide | Dilauryl Ketone | Beckacite 1118 [5] | Polypale D [6] | THF/Tol [7] | MEK/Tol [8] | THF/EA [9] | THF/TCTFE [10] | THF/Tol/PrOH [11] | | | 180 | 220 | 250 | 260 | 270 | 280 | | |
| 28 | 2 | | | 1.0 | x | | | | | | | 0 | 0 | 0 | 0 | 0 | 0 | | |
| 29 | 2 | | | | | x | | | | | | 0 | 0 | 0 | 0 | 0 | 0 | | |
| 30 | 2 | | | | | x | | | | | | 0 | 0 | 0 | 0 | 0 | 0 | | |
| 31 | 2 | | | | | x | | | | | | 0 | 0 | 0 | 0 | 0 | 0 | | |
| 32 | 2 | | | | | x | | | | | | 0 | 0 | 0 | 0 | 0 | 0 | | |
| 33 | 2 | | | | | | x | | | | | 0 | 40 | 50 | 20 | 15 | 0 | | [13] P |
| 34 | 2 | | | | | | | x | | | | 0 | 200 | 75 | 15 | 0 | 60 | | P |
| 35 | 2 | | | | | | | | x | | | 0 | 200 | 300 | 400 | 600 | 700 | | P |
| 36 | 2 | | | | x | | | | | | | 0 | 0 | 0 | 0 | 0 | 0 | | |
| 37 | 2 | | | | x | | | | | | | 15 | 125 | 325 | 300 | 325 | 300 | | |
| 38 | 2 | | | | x | | | | | | | 30 | 150 | 350 | 400 | 500 | 600 | | |
| 39 | 2 | | | | x | | | | | | | 30 | 150 | 200 | 300 | 400 | 450 | | |
| 40 | | 2 | | | x | | | | | | | 0 | 0 | 50 | 75 | 100 | 150 | | |
| 41 | 2 | | 0.3 | | x | | | | | | | 0 | 0 | 0 | 0 | 0 | 0 | | |
| 42 | 2 | | 0.2 | | x | | | | | | | 0 | 0 | 0 | 0 | 0 | 0 | | |
| 43 | 2 | | | | x | | | | | | | 0 | 0 | 0 | 0 | 25 | 75 | | |
| 44 | 2 | | | | x | | | | | | | 0 | 200 | 250 | 400 | 350 | 450 | | |
| 45 | 2 | | 1.5 | | x | | | | | | | 0 | 0 | 0 | 50 | 100 | 300 | | |
| 46 | | | 0.5 | | | | | | | | | 0 | 0 | 100 | 150 | 200 | 400 | | |
| 47 | | | 0.5 | | x | | | | | | | 0 | 50 | 150 | 250 | 350 | 500 | | |
| 48 | 2 | | | | x | | | | | | | 0 | 0 | 0 | 0 | 0 | 0 | | |
| 49 | 2 | | | | x | | | | | | | 0 | 0 | 0 | 0 | 0 | | | |

[1] Vinylidene chloride/acrylonitrile copolymer; weight ratio 90.5/9.5.
[2] Vinylidene chloride/acrylonitrile/itaconic acid copolymer; weight ratio 90.5/9/0.5.
[3] Vinylidene chloride/acrylonitrile/methyl methacrylate/itaconic acid copolymer; weight ratio 91.5/6/2/0.5.
[4] Vinylidene chloride/methyl acrylate/itaconic acid copolymer; weight ratio 90/9.5/0.5.
[5] Glyceryl ester of maleic anhydride-treated rosin (Reichold Chemicals Inc.).
[6] Polymerized rosin (Hercules Powder Co.).
[7] Tetrahydrofuran/toluene.
[8] Methyl ethyl ketone/toluene.
[9] Tetrahydrofuran/ethyl acetate.
[10] Tetrahydrofuran/trichlorotrifluoroethane.
[11] Tetrahydrofuran/toluene/isopropyl alcohol.
[12] Borderline.
[13] High.
[14] Poor.

The salient advantage of this invention is that it provides a coated regenerated cellulose or like film whose coating is based on a vinylidene chloride copolymer and which may be used in a trouble-free manner with no sticking or jamming in packaging machines having crimped sealing jaws such as the make-and-fill machines. Another advantage is that the superior crimp jaw release of the film has been achieved while maintaining satisfactory adhesion of the coating, heat sealability, low water vapor permeability, antiblocking characteristics, appearance, and machine running characteristics of the film. A still further advantage is that the coating composition of this invention possesses good release properties from all of the materials commonly used on the surface of crimped sealing jaws including cold rolled steel, Hastelloy, brass, and bronze.

What is claimed is:

1. A heat-sealable coating composition for organic polymeric film comprising essentially a volatile organic solvent solution of (1) a copolymer of vinylidene chloride and at least one other ethylenically unsaturated monomer copolymerizable therewith, said copolymer containing at least 87% by weight of vinylidene chloride, (2) from about 2 to 6 parts by weight of candelilla wax per 100 parts by weight of said copolymer, and (3) from 1 to 3 parts by weight of a stearate salt selected from the group consisting of calcium and ammonium stearates.

2. The composition of claim 1 comprising additionally from 0.05 to 2 parts of a solid particulate material effective to enhance film-to-film slip per 100 parts of vinylidene chloride copolymer.

3. The composition of claim 1 comprising additionally from 0.2 to 1.0 part by weight of talc per 100 parts of vinylidene chloride copolymer.

4. The composition of claim 1 comprising additionally from 0.1 to 1.0 part by weight an organic carboxylic acid per 100 parts of vinylidene chloride copolymer.

5. The composition of claim 4 wherein the organic carboxylic acid is maleic acid.

6. The composition of claim 1 comprising additionally from about 0.5 to 2.5 parts by weight, per 100 parts of vinylidene chloride copolymer, of a compound selected from the group consisting of saturated and olefinically unsaturated amides and ketones containing between 18 and 26 carbon atoms.

7. The composition of claim 6 wherein said compound is stearamide.

8. The composition of claim 1 comprising additionally up to one part by weight, per 100 parts of vinylidene chloride copolymer, of a blending agent selected from the group consisting of the glyceryl ester of maleic anhydride modified rosin, and polymerized rosin.

9. A organic polymeric film having on at least one surface a continuous adherent coating comprising essentially (1) a copolymer of vinylidene chloride and at least one other ethylenically unsaturated monomer copolymerizable therewith, said copolymer containing at least 87% by weight of vinylidene chloride, (2) from about 2 to 6 parts by weight of candelilla wax per 100 parts by weight of said copolymer, and (3) from about 1 to 3 parts by weight of a stearate salt selected from the group consisting of calcium and ammonium stearates.

10. Regenerated cellulose film having on at least one surface a continuous adherent coating comprising essentially (1) a copolymer of vinylidene chloride and at least one other ethylenically unsaturated monomer copolymerizable therewith, said copolymer containing at least 87% by weight of vinylidene chloride, (2) from about 2 to 6 parts by weight of candelilla wax per 100 parts by weight of said copolymer, and (3) from about 1 to 3 parts by weight of a stearate salt selected from the group consisting of calcium and ammonium stearates.

11. The coated film of claim 10 wherein the copolymer is vinylidene chloride/acrylonitrile copolymer in the weight ratio of 90.5/9.5.

12. The coated film of claim 10 wherein the copolymer is a vinylidene chloride/acrylonitrile/itaconic acid copolymer in the weight ratio of 90.5/9/0.5.

13. The coated film of claim 10 wherein the copolymer is a vinylidene chloride/acrylonitrile/methylmethacrylate/itaconic acid copolymer in the weight ratio of 91.5/6/2/0.5.

14. The coated film of claim 10 wherein the copolymer is a vinylidene chloride/methacrylic acid/itaconic acid copolymer in the weight ratio of 90/9.5/0.5.

15. The coated film of claim 10 wherein the coating comprises additionally from 0.05 to 2 parts of a solid particulate material effective to enhance film-to-film slip per 100 parts of vinylidene chloride copolymer.

16. The coated film of claim 10 wherein the coating comprises additionally from 0.1 to 1.0 part by weight an organic carboxylic acid per 100 parts of vinylidene chloride copolymer.

17. The coated film of claim 10 wherein the coating comprises additionally from about 0.5 to 2.5 parts by weight, per 100 parts of vinylidene chloride copolymer, of a compound selected from the group consisting of saturated and olefinically unsaturated amides and ketones containing between 18 and 26 carbon atoms.

18. The coated film of claim 10 wherein the coating comprises additionally up to one part by weight, per 100 parts of vinylidene chloride copolymer, of a blending agent selected from the group consisting of the glyceryl ester of maleic anhydride modified rosin, and polymerized rosin.

19. The coated film of claim 10 wherein the coated surface is sized with sodium lauryl sulfate.

20. Regenerated cellulose film having on at least one surface a continuous adherent coating consisting of (1) 100 parts by weight of a copolymer of vinylidene chloride, acrylonitrile, methyl methacrylate, and itaconic acid in the weight ratio of 91.5/6/2/0.5 respectively, (2) 2 parts of candelilla wax, (3) 2 parts of calcium stearate, (4) 0.4 part of talc, and (5) 0.5 part of maleic acid.

References Cited

UNITED STATES PATENTS

| | | | |
|---|---|---|---|
| 2,275,957 | 3/1942 | Groff | 260—23 X |
| 2,467,550 | 4/1949 | Fletcher et al. | 260—23 X |
| 2,468,165 | 4/1949 | Brister et al. | 260—23 X |
| 2,711,996 | 6/1955 | Hofrichter | 260—23 X |
| 2,857,341 | 10/1958 | Colwell et al. | 260—23 |
| 2,909,449 | 10/1959 | Banigan | 117—145 |
| 2,950,992 | 8/1960 | Brillhart et al. | 117—145 |
| 2,990,391 | 6/1961 | Grantham | 260—23 X |
| 3,057,756 | 10/1962 | Cornwell | 117—145 |
| 3,058,939 | 10/1962 | Meier | 117—145 |
| 3,085,030 | 4/1963 | Hendrickson et al. | 117—145 |
| 3,232,791 | 2/1966 | Whitehouse | 117—145 |

DONALD E. CZAJA, *Primary Examiner.*

LEON J. BERCOVITZ, *Examiner.*

R. A. WHITE, *Assistant Examiner.*